United States Patent
DiSanto et al.

(10) Patent No.: US 8,219,798 B1
(45) Date of Patent: *Jul. 10, 2012

(54) METHOD AND SYSTEM FOR SECURING E-MAIL TRANSMISSIONS

(75) Inventors: Frank J. DiSanto, Melville, NY (US); Denis A. Krusos, Melville, NY (US); Edward Lewit, Melville, NY (US)

(73) Assignee: Copytele, Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/928,668

(22) Filed: Dec. 16, 2010

Related U.S. Application Data

(63) Continuation of application No. 11/724,783, filed on Mar. 16, 2007, now Pat. No. 7,877,594.

(60) Provisional application No. 60/782,771, filed on Mar. 16, 2006.

(51) Int. Cl.
H04L 9/00 (2006.01)

(52) U.S. Cl. ...................................... 713/152
(58) Field of Classification Search ........... 713/150–153
See application file for complete search history.

(56) References Cited

U.S. PATENT DOCUMENTS

| | | | |
|---|---|---|---|
| 4,581,746 A | 4/1986 | Arnold | |
| 5,166,977 A | 11/1992 | Ross | |
| 5,222,136 A | 6/1993 | Rasmussen et al. | |
| 5,253,293 A | 10/1993 | Shigemitsu et al. | |
| 5,410,599 A | 4/1995 | Crowley et al. | |
| 5,455,861 A | 10/1995 | Faucher et al. | |
| 5,594,798 A | 1/1997 | Cox et al. | |
| 5,621,800 A | 4/1997 | Weng et al. | |
| 5,778,071 A | 7/1998 | Caputo et al. | |
| 6,430,691 B1 | 8/2002 | DiSanto et al. | |
| 6,442,595 B1 | 8/2002 | Kelly | |
| 6,442,686 B1 | 8/2002 | McArdle et al. | |
| 6,567,914 B1 | 5/2003 | Just et al. | |
| 6,584,564 B2 | 6/2003 | Olkin et al. | |
| 6,732,101 B1 | 5/2004 | Cook | |
| 6,760,752 B1 | 7/2004 | Liu et al. | |
| 6,851,049 B1 | 2/2005 | Price, III | |
| 6,856,686 B2 | 2/2005 | DiSanto et al. | |
| 6,993,574 B2 | 1/2006 | Hall | |
| 7,054,905 B1 | 5/2006 | Hanna | |
| 7,082,458 B1 | 7/2006 | Guadagno et al. | |
| 7,092,993 B2 | 8/2006 | Goldberg | |
| 7,620,685 B2 | 11/2009 | Marcjan | |
| 2003/0126463 A1 | 7/2003 | Sistla | |
| 2005/0021963 A1 | 1/2005 | Tomkow | |
| 2005/0138353 A1 | 6/2005 | Spies et al. | |
| 2005/0198511 A1 | 9/2005 | Tomko | |
| 2006/0053278 A1 | 3/2006 | Tanimoto | |
| 2006/0053280 A1 | 3/2006 | Kittle et al. | |
| 2007/0005713 A1 | 1/2007 | LeVasseur et al. | |

FOREIGN PATENT DOCUMENTS

WO    WO 02/09346    1/2002

*Primary Examiner* — Ellen Tran
(74) *Attorney, Agent, or Firm* — Law Office of Carl Giordano, PA

(57) ABSTRACT

A method for frustrating unauthorized access to an electronic mail message having address, body and attachment information and being transmitted from a first computer to a second computer, including: at the first computer: detecting a request to send the message; encrypting the extracted body information; replacing the extracted body information with the encrypted body information; extracting the attachment information; encrypting the extracted attachment information; replacing the extracted attachment information with the encrypted attachment information; returning the message having the encrypted body and attachment information to the mail user application; and transmitting the message having the encrypted body and attachment information to a third computer; and, at the third computer: decrypting and re-encrypting the transmitted body information; decrypting and re-encrypting the transmitted attachment information; and, transmitting the re-encrypted body and attachment information to the second computer.

21 Claims, 6 Drawing Sheets

METHOD AND SYSTEM FOR SECURING E-MAIL TRANSMISSIONS

RELATED APPLICATIONS

This application is a continuation of and claims priority to U.S. patent application Ser. No. 11/724,783 filed Mar. 16, 2007 (now U.S. Pat. No. 7,877,594), titled: METHOD AND SYSTEM FOR SECURING E-MAIL TRANSMISSIONS, which claims the benefit of U.S. Patent Application Ser. No. 60/782,771, filed Mar. 16, 2006, entitled METHOD AND SYSTEM FOR SECURING E-MAIL TRANSMISSION, the entire disclosures of both of which are hereby incorporated by reference as if being set forth in their entirety, herein.

FIELD OF INVENTION

The present invention relates to electronic mail transmission and reception methods and systems.

BACKGROUND OF THE INVENTION

Electronic mail (e-mail) is a method of composing, sending and receiving messages between computing devices over a network. E-mail systems typically use Simple Mail Transfer Protocol (SMTP) to send messages and Post Office Protocol (POP) to receive messages, although other protocols may be used. E-mails may typically include one or more attachments, in the form of documents or files.

"Computing device", as used herein, refers to a general purpose computing device that includes a processor. A processor generally includes a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, generally refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), and/or electrically erasable programmable read-only memory (EEPROM) chips, by way of further non-limiting example only. Memory may take the form of internal or external disc drives, for example. Memory may be internal or external to an integrated unit including a processor. Memory preferably stores a computer program or code, e.g., a sequence of instructions being operable by a processor. Examples of computing devices include, by way of non-limiting example, desktop personal computers, portable personal computers, personal digital assistants (PDAs) and sophisticated digital cellular telephones.

E-mail messages are typically communicated using a network. "Network", as used herein, generally refers to a group of two or more computing devices being communicatively linked together. There are many types of computer networks, including: local-area networks (LANs), wide-area networks (WANs), campus-area networks (CANs), metropolitan-area networks MANs), home-area networks (HANs) and the global interconnection of computer networks and computing devices commonly referred to as the Internet.

As demand grows for enhanced security of e-mail messages, (so that unauthorized interception of e-mail messages is minimized), so does the need for methods and systems that satisfy more stringent security requirements. By way of further example, certain requirements under the Health Insurance Portability and Accountability Act of 1996 (HIPAA) and/or the Sarbanes-Oxley Act of 2002 may require increased security of e-mail messages when used as a medium for communicating information that falls within the purview of these Acts.

Further, archival requirements for e-mail messages may also be mandated in corporate and/or government settings, while user compliance with e-mail usage policies, e.g., corporate policies, may need to be reviewed and enforced. It is believed to be desirable to address one or more of these needs in a manner that is transparent to an end user.

SUMMARY OF THE INVENTION

A method for frustrating unauthorized access to an electronic mail message having address, body and attachment information and being transmitted from a first computing device to a second computing device, including:

at the first computing device: detecting a request to send the message from a mail user agent application being executed at the first computing device; extracting the body information from the message; encrypting the extracted body information; replacing the extracted body information in the message with the encrypted body information; extracting the attachment information from the message; encrypting the extracted attachment information; replacing the extracted attachment information in the message with the encrypted attachment information; returning the message having the encrypted body and attachment information to the mail user application for transmission to the second computing device in accordance with the address information; and transmitting the message having the encrypted body and attachment information in lieu of the extracted body and attachment information to a third computing device distinct from the second computing device; and, at the third computing device: decrypting and re-encrypting the transmitted body information; decrypting and re-encrypting the transmitted attachment information; and, transmitting the re-encrypted body and attachment information in lieu of the extracted body and attachment information to the second computing device.

BRIEF DESCRIPTION OF THE FIGURES

Understanding of the present invention will be facilitated by considering the following detailed description of the preferred embodiments of the present invention taken in conjunction with the accompanying drawings, in which like numerals refer to like parts, and.

DETAILED DESCRIPTION OF THE INVENTION

It is to be understood that the figures and descriptions have been simplified to illustrate elements that are relevant for a clear understanding of the present invention, while eliminating, for the purpose of clarity, many other elements found in typical computing and e-mail systems and methods of making and using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
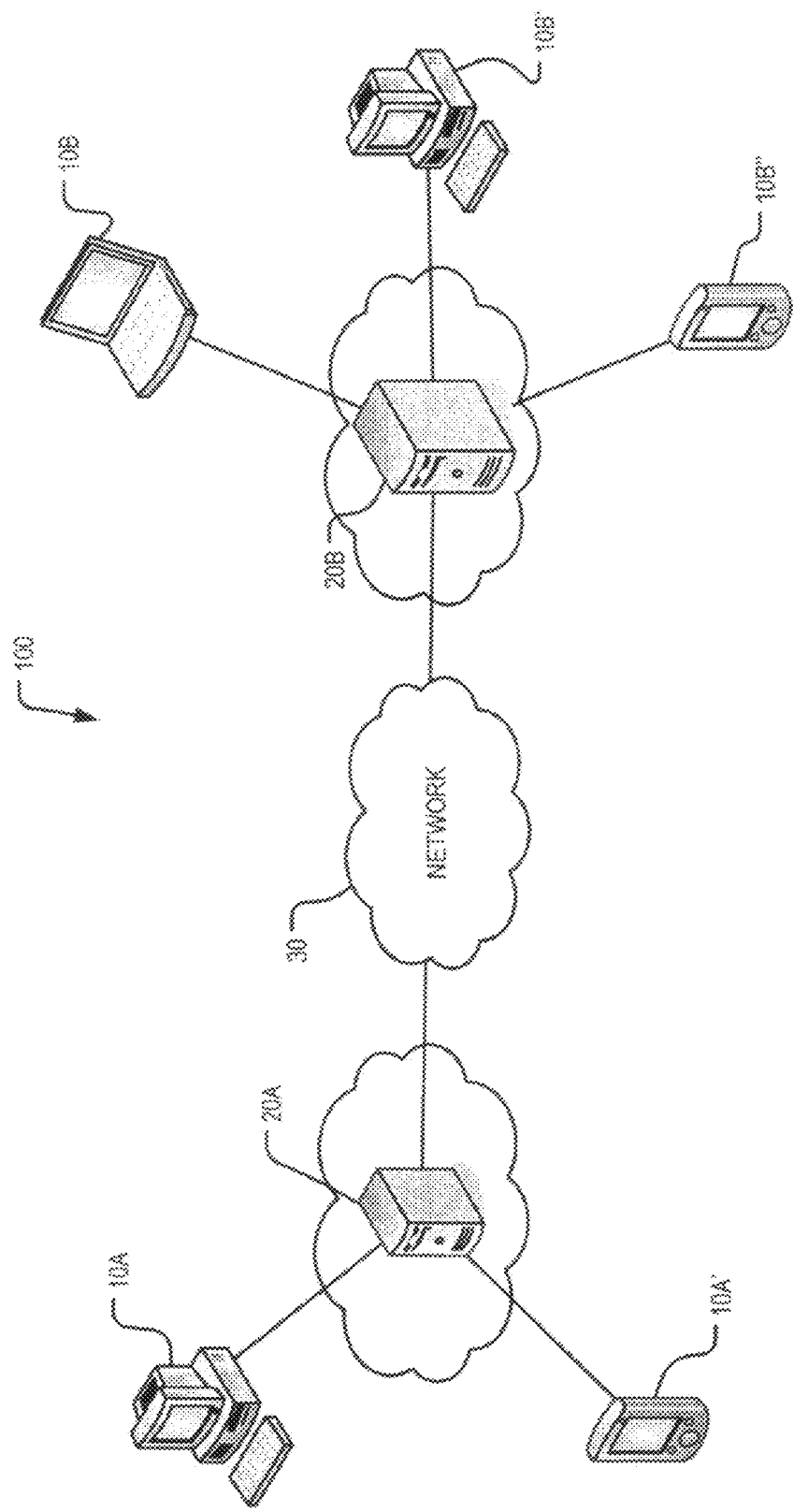
FIG. 1 illustrates a block of a system suitable for use with the present invention.

FIG. 1 shows a block diagram representation of a system 100 suitable for use with the present invention. System 100 generally includes computing devices 10A, 10A', 10B, 10B', 10B" communicatively connected through servers 20A, 20B to network 30. "Server", as used herein, generally refers to a computing device or application communicatively coupled to a network that manages network resources. A server may refer to a discrete computing device, or may refer to the program that is managing resources rather than the entire computing device. For example, a file server is a computing device or program employing a storage device for storing files, while a database server is a computing device or program that processes database queries. In the illustrated embodiment of FIG. 1, servers 20A and 20B are e-mail and file servers. It should be understood that while five (5) computing devices 10A, 10A', 10B, 10B', 10B" are shown in the illustrated embodiment of FIG. 1, a substantially greater number of computing devices may be supported. Furthermore, while two (2) servers 20A, 20B are shown in the exemplary embodiment of FIG. 1, a substantially greater number of servers may be supported.

Referring still to FIG. 1, server(s) 20A, 20B allow e-mails to be communicated between mail user agent (MUA) application programs being executed by computing devices 10A, 10A', 10B, 10B', 10B", respectively. One non-limiting example of a MUA suitable for use with the present invention is the e-mail application Outlook, which is commercially available from Microsoft Corporation. Non-limiting examples of e-mail server applications suitable for use with the present invention include Exchange, which is commercially available from Microsoft Corporation, and Posffix, which is a Linux based mail server application.

In operation, server 20A may communicate an e-mail message from a MUA being executed by computing device 10A to a MUA being executed by computing device 10A'. Server 20B may communicate an e-mail message from a MUA being executed by computing device 10B' to a MUA being executed by computing device 10B". Servers 20A and 20B may cooperatively communicate an e-mail message, via network 30, from a MUA being executed by computing device 10A' to a MUA being executed by computing device 10B, and vice-a-versa.

Figure 2:
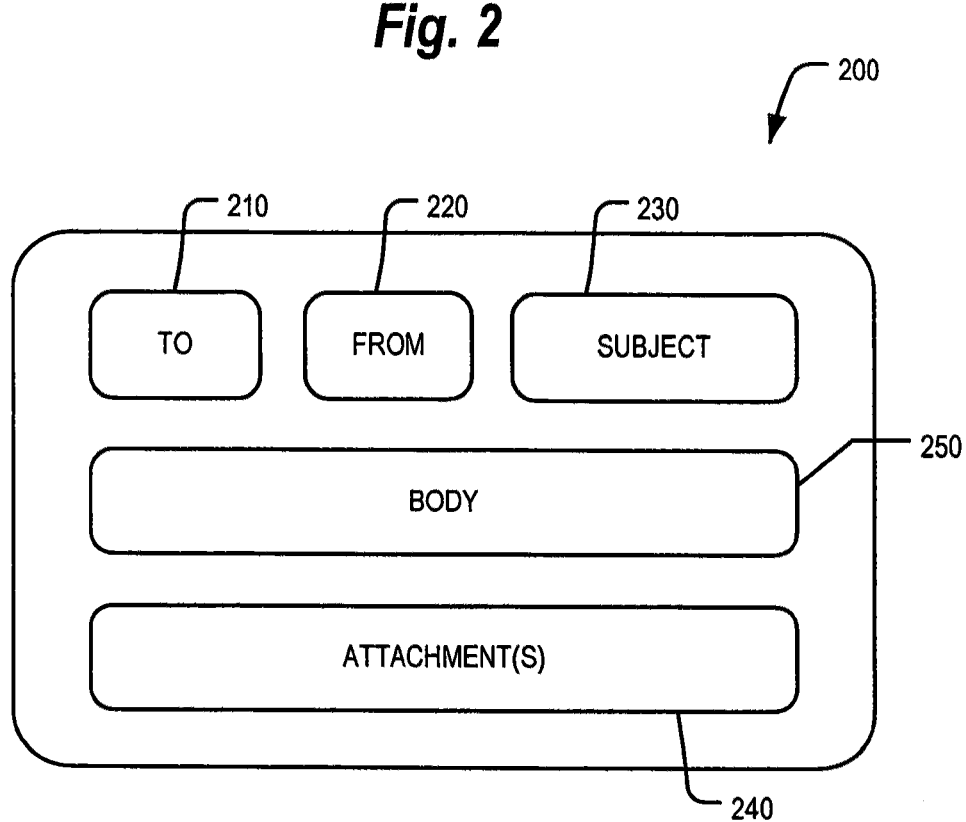
FIG. 2 illustrates a block diagram of an e-mail message suitable for use with the present invention; and, FIGS. 3-6 illustrate non-limiting flow diagrams of processes according to aspects of the present invention.

FIG. 2 shows a block diagram of an e-mail message 200 suitable for use with the present invention. Message 200 generally includes a "to" field 210 identifying intended message recipient(s) and "from" field 220 identifying a message originator. "To" field 210 may optionally include carbon copy ("cc") intended message recipient(s) as well, including blind carbon copy ("bcc") intended message recipient(s). Message 200 also includes "subject" field 230, which is intended to summarize the subject of message 200. Message 200 also includes "body" field 230, which is the body of the message. Body 230 generally includes text content, but may include other types of content as well. Message 200 may also include one or more attachment(s) 240. Attachment(s) 240 may typically take the form of one or more files, such as text files, spreadsheet files, database files and/or multimedia files, all by way of non-limiting example. It should be understood that message 200 may include other components typical of conventional e-mail messages, and/or omit one or more of the elements illustrated in FIG. 2.

The general operation of system 100 will be further discussed as it relates to an exemplary embodiment wherein e-mail message 200 is communicated using servers 20A, 20B via network 30, from a MUA being executed by computing device 10A' to a MUA being executed by computing device 10B. An originating user, or originator, composes message 200 using the MUA being executed by device 10A'. The originator types in, or selects from an address book, the e-mail address of the intended recipient, or user of device 20B. The originator then activates a "send" button in the MUA being executed by device 10A', which causes that MUA to format and send the message to server 20A. Server 20A identifies the destination address, such as by examining one or more fields in the formatted protocol (e.g., SMTP). Server 20A then interfaces with a conventional Domain Name System (DNS), to identify a mail exchange server accepting messages for the domain corresponding to the identified destination address. A DNS server responds with a mail exchange record listing server 20B. Server 20A then sends message 200 to server 20B, which then delivers it to the mailbox of the recipient.

Typically, when a MUA is started, and/or at predetermined temporal intervals, and/or when the recipient activates a "get mail" or "send/receive" button in the MUA being executed by device 10B, the message is retrieved from server 20B, such as by using Post Office Protocol version 3 (POP3). The MUA executed by device 10B then provides access to the retrieved message to the recipient.

E-mail messages are generally not encrypted, unless the originator takes specific steps. Further, e-mail messages typically traverse intermediate computing devices (that are part of network 30 of FIG. 1, for example) before reaching their intended destination. Accordingly, it is relatively easy for third persons to intercept and read messages. This may prove particularly troublesome where security of the communicated information is important, such as to comply with the requirements of HIPAA, other regulations and/or corporate policies. There are cryptography applications that can be used to secure e-mail messages, such as Virtual Private Networks, message encryption using PGP or the GNU Privacy Guard, encrypted communications with the e-mail servers using Transport Layer Security and Secure Sockets Layer, and/or encrypted authentication schemes such as Simple Authentication and Security Layer. However, these applications typically require the originator to take special action for each instantiation.

According to an aspect of the present invention, e-mail transmissions, including attachments, over the network 30 (FIG. 1) are encrypted. According to another aspect of the present invention, there is provided a system and method that encrypts/decrypts e-mail transmissions without requiring user intervention at the MUA.

"Encryption", as used herein, generally refers to the translation of data into a secret form. "Decryption", as used herein, generally refers to the reverse translation. Unencrypted data is referred to as plain text; encrypted data is referred to as cipher text. Symmetric and/or asymmetric encryption techniques may be used. Symmetric encryption is a type of encryption where the same key is used to encrypt and decrypt the data. Asymmetric encryption uses two keys—a public key that is generally known and a private or secret key known only to the key owner. The public and private keys are related in such a way that data encrypted using the public key can only be decrypted using the corresponding private key. According to an aspect of the present invention, asymmetric cryptography may be used to establish or exchange one or more symmetric keys used for encrypting/decrypting e-mails, and/or email components.

According to an aspect of the present invention, a "plug in" software module that integrates with the MUA's on the originator (creator) side and on the destination (receiver) side may be provided. Such an agent plug-in may encrypt e-mail transmissions from the originator in a manner that is transparent to the originator. The agent plug-in may also be used to provide additional functionality, such as e-mail usage policy compliance confirmation, such as by restricting e-mail communication to authorized e-mail servers by canceling attempted transmissions to other e-mail servers.

A "plug-in" is generally a computer program that adds a specific feature or service to another computer program. A plug-in interacts with the other program to provide certain functionality. The main program, e.g., the MUA, typically provides a way for plug-ins to register themselves, and a protocol by which data is exchanged there between. Plug-in, as used herein, also includes extensions, which typically modify or add to existing computer program functionality. For purposes of completeness, extensions are computer programs that generally have fewer restrictions on their actions, and may provide their own user interface, for example.

According to an aspect of the present invention, a "plug in" software module may optionally be provided for the e-mail server(s). Such an e-mail server plug-in enables the e-mail server to decrypt email messages encrypted by agent plug-in's upon receipt, and then re-encrypt and send the messages to their destinations. The e-mail server plug-in may also be used to provide additional functionality, such as e-mail content monitoring, e-mail archiving, and other services using a clear or cipher-text version of the email.

According to an aspect of the present invention, an originator or user generates and addresses an e-mail message as discussed. The user then activates a send button in the MUA being executed on the user's computing device. The agent module detects the send action, intercepts the message, encrypts it, and sends the encrypted version back to the MUA for transmission. It may further restrict transmissions to authorized e-mail servers.

By way of non-limiting example, the send action may be detected as a hook in the MUA. A "hook", as used herein, is generally a method call from a main computer program to another computer program component, such as a plug-in. The main computer program, e.g., the MUA, makes a call responsively to the send button being activated by the originator. The hook passes the e-mail message to the hook component, e.g., the agent plug-in, which processes the e-mail message and then returns it to the main program for transmission.

If an e-mail server plug-in is installed, it may detect an incoming message to that e-mail server and determine if that message is encrypted. A hook in the e-mail server application may be used. If a received message is encrypted, it will decrypt the message and pass the clear text version to the e-mail server. When the e-mail server, in turn, attempts to transmit the message to the recipient's mail server, the server plug-in detects the attempted transmission, intercepts it and encrypts it for transmission to the recipient's e-mail server in a method analogous to the above-discussed agent plug-in. When received by a computing device also running an agent plug-in, that agent plug-in detects the incoming message, determines if it is encrypted and, if so, intercepts, decrypts and passes it to the receiving MUA in an analogous manner.

Thus, encryption/decryption and key handling functions are accomplished in a manner that is transparent to the users, e.g., originator and recipient. Further, e-mail usage policies may be policed by restricting access to authorized e-mail servers only using an agent plug in. And, archiving requirements may be met by automatically archiving copies of e-mails processed by a server plug in.

Figure 3:
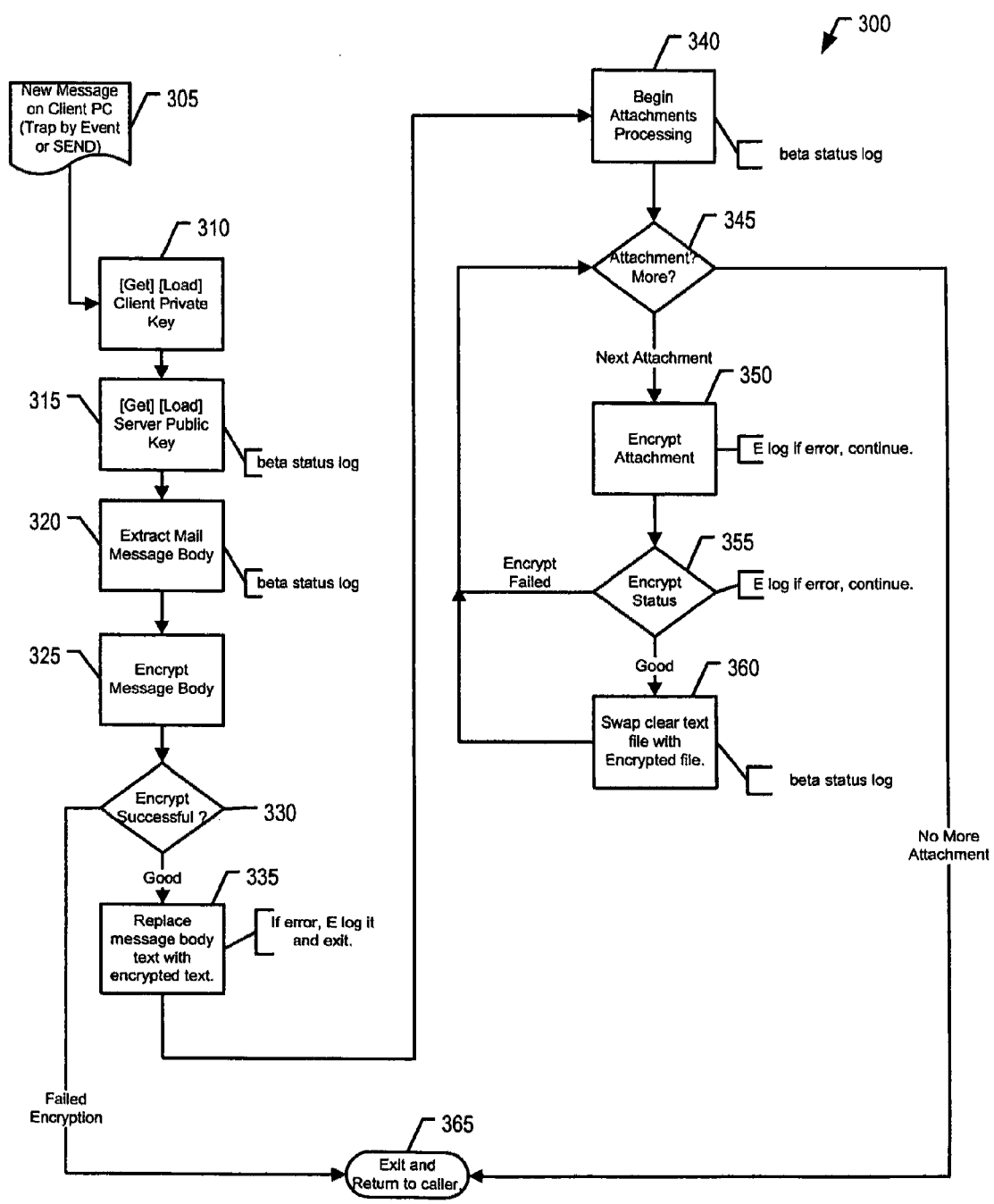
Figure 4:
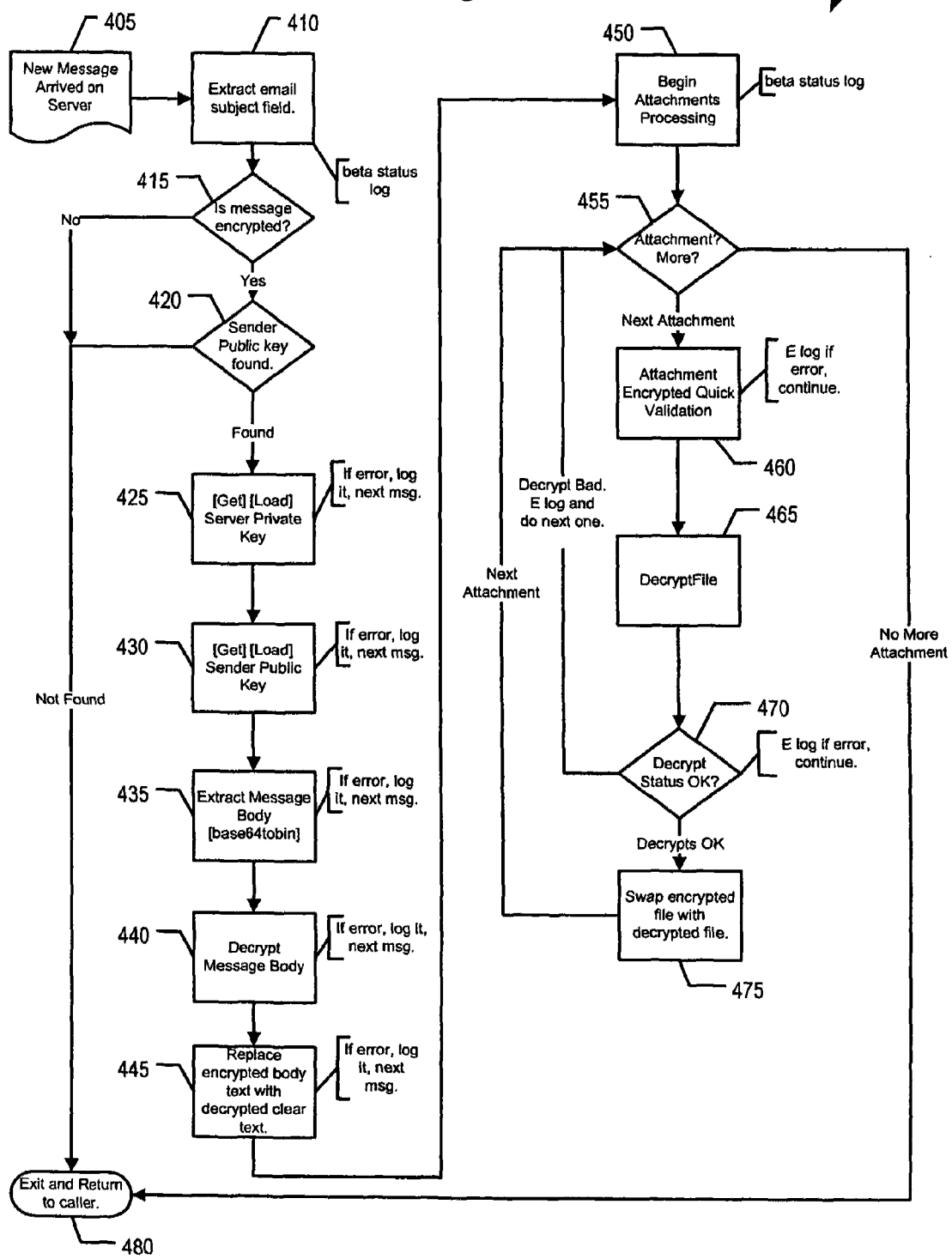
Figure 5:
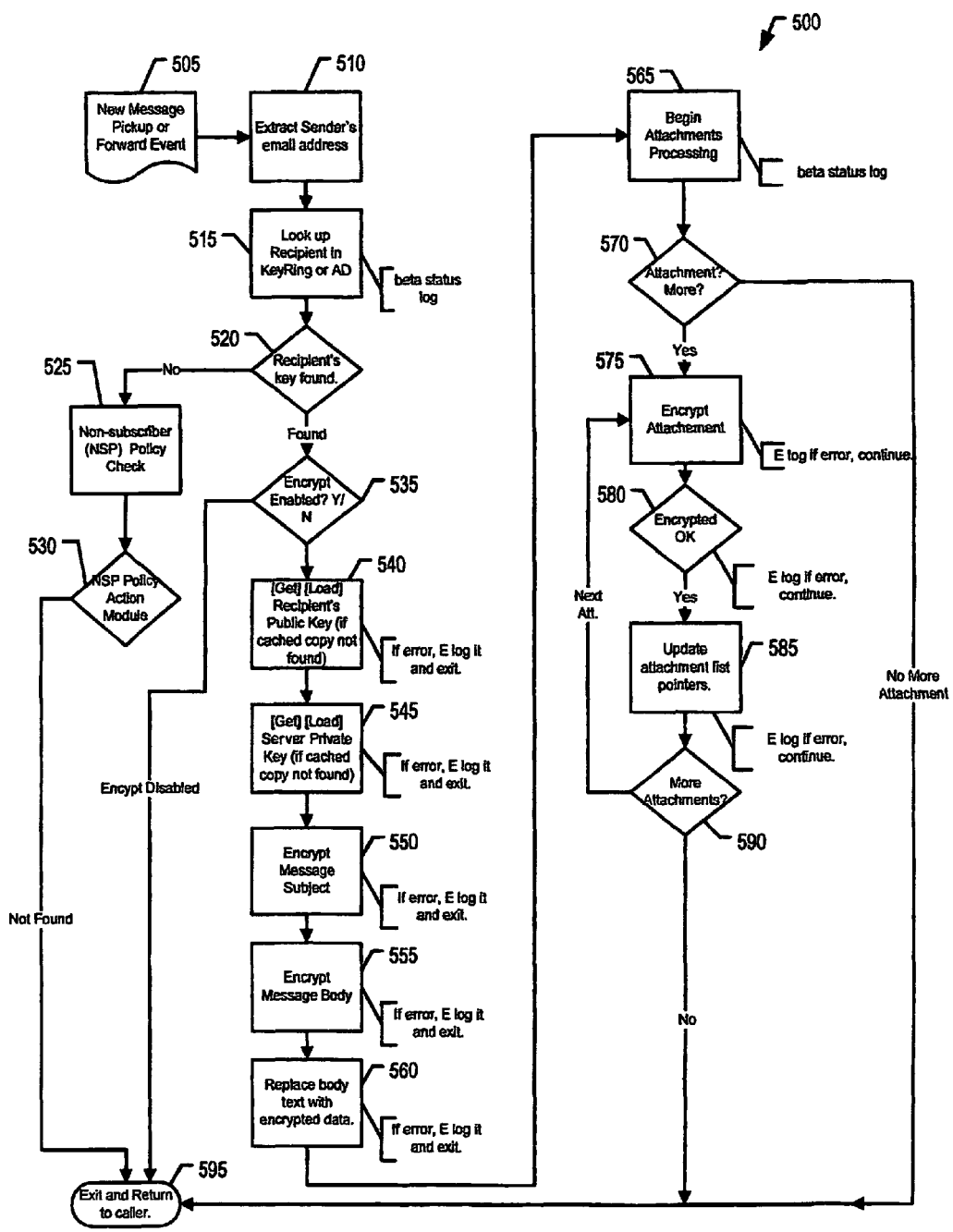
Figure 6:
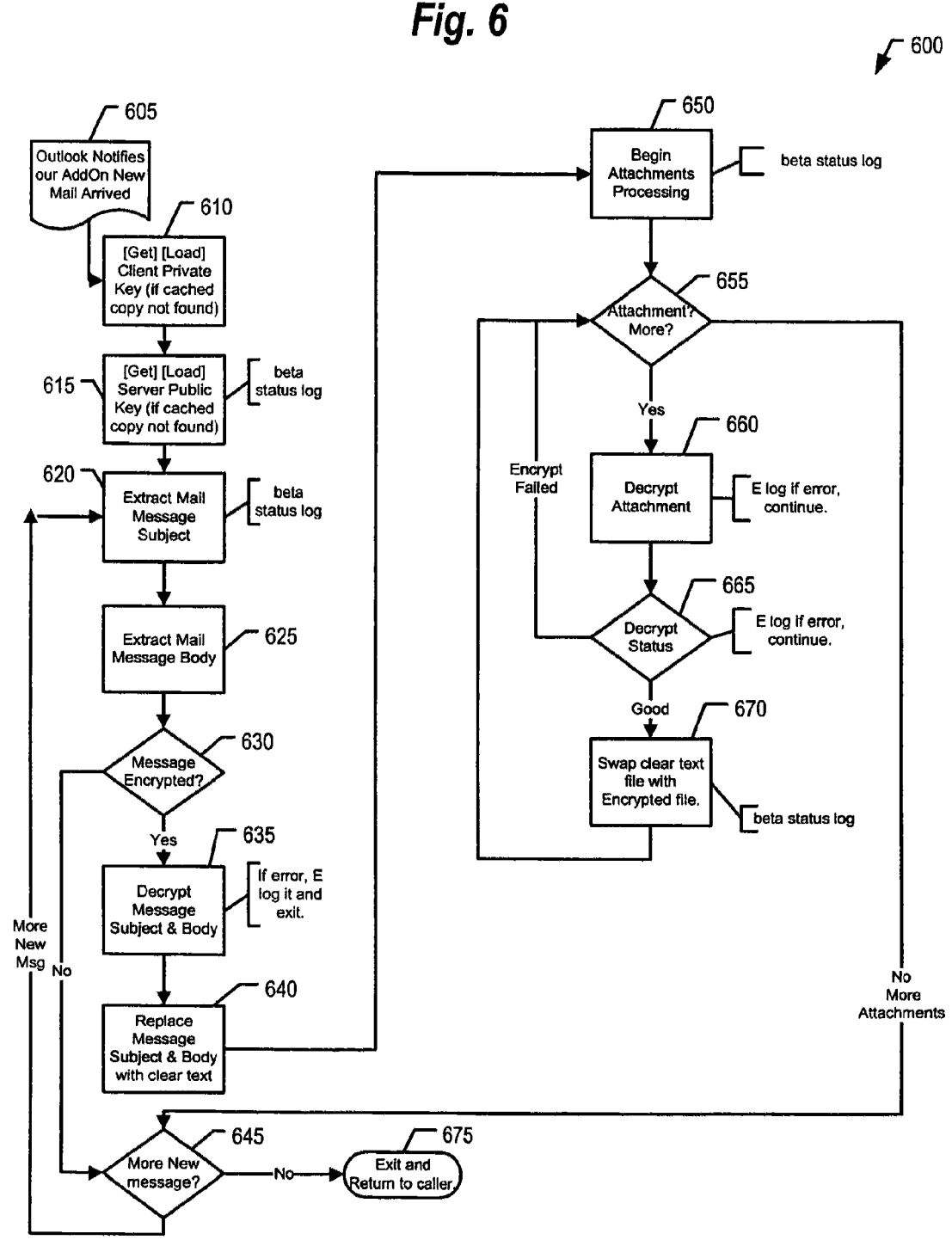

Referring now to FIGS. 3-6, there are shown exemplary flow diagrams of processes according to aspects of the present invention. FIG. 3 illustrates a flow diagram of a process suitable for use with an originator's MUA. FIG. 4 illustrates a flow diagram of a process suitable for receiving an e-mail transmitted in accordance with the flow diagram of FIG. 3 using a server. FIG. 5 illustrates a flow diagram of a process suitable for transmitting an e-mail received in accordance with the flow diagram of FIG. 4 using the server. And, FIG. 6 illustrates a flow diagram of a process suitable for receiving an e-mail transmitted in accordance with the flow diagram of FIG. 5 using a recipient's MUA.

Referring first to FIG. 3, there is shown an operation flow 300, which commences with detecting a new message to be sent by a MUA at block 305. A private key corresponding to the originator is then acquired at block 310. A public key corresponding to the mail server (mail transfer agent or MTA) associated with the originator is then acquired at block 315. According to an embodiment of the present invention, the keys acquired at blocks 310, 315 may be stored at the originating MUA executing computing device, such as when the MUA is installed on the originating computing device. Alternatively, one or more of the acquired keys may be stored on another computing device so as to be recoverable by the originating MUA, such as via a server and/or network. Optionally, where a symmetric key is used, the symmetric key can be generated using the identified public and private keys. The message body is then extracted (e.g., 250 in FIG. 2) at block 320. The message body is then encrypted using the acquired keys at block 325. It is then determined if the encryption was successful, or if an error occurred, at block 330. If the encryption fails, a predetermined action, such as user notification is taken, operation flow 300 is ended, and the MUA is returned to block 365. If the encryption was successful, the clear text message body is replaced with the cipher text message body at block 335.

Attachments processing begins at block 340. It is determined if any attachments that have not been encrypted are present at block 345. If there are none, operation flow 300 is ended and processing proceeds to block 365. If there are attachments to yet be processed, a yet unprocessed attachment is encrypted at block 350. It is then determined if the encryption was successful, or if an error occurred, at block 355. If the encryption fails, a predetermined action, such as user notification is taken, and operation flow 300 returns to block 345, so the attachment may be processed again. Alternatively, the attachment may be stripped, or the e-mail rejected. If the encryption is successful, the clear text attachment is replaced with the cipher text attachment at block 360, and operation flow 300 returns to block 345, to determine if there are any other attachments to be processed. The encrypted e-mail is then sent to the mail server (MTA) associated with the originator.

Referring now to FIG. 4, there is shown an operation flow 400 suitable for use by the mail server (MTA) associated with the originator upon receiving such an encrypted e-mail. An operation flow 400 commences with a new message arriving at block 405. The subject field is extracted at block 410. It is then determined if the message is encrypted at block 415. If the message is not encrypted, operation flow 400 is ended and the server is returned to conventional operation at block 480. If the message is encrypted, the originator's public key is located at block 420. If the originator's public key cannot be found, operation flow 400 is ended and the server is returned to conventional operation at block 480. If the originator's public key is found, the server's private key is acquired at block 425. The originator's public key is acquired at block 430. Optionally, where a symmetric key is used, the symmetric key can be generated using the identified public a private keys. The cipher text message body is extracted at block 435. The cipher text message body is decrypted at block 440. The cipher text message body is then replaced with the deciphered, clear text message body at block 445.

Attachments processing begins at block 450. It is determined if any attachments that have not been decrypted are present at block 455. If there are none, operation flow 400 is ended and the server is returned to conventional operation at block 480. If there are attachments to yet be processed, a yet unprocessed attachment is validated at block 460, and decrypted at block 465. It is then determined if the decryption was successful, or if an error occurred, at block 470. If the decryption fails, a predetermined action, such as user notification is taken, and operation flow 400 returns to block 455, so the attachment may be processed again. If the decryption is successful, the cipher text attachment is replaced with the clear text attachment at block 475, and operation flow 400 returns to block 455, to determine if there are any other attachments to be processed. Optionally, a copy of a public key useful for later encryption/decryption processing, such as a client's or server's public key may be attached to the e-mail.

Referring now to FIG. 5, there is shown an operation flow 500. Operation flow 500 is suitable for use with a server after an operation flow 400. Operation flow 500 commences with a message to be delivered event 505. The originator's e-mail address is extracted from the message to be delivered at block 510. The recipient is then looked up in a recipient key-ring or database at block 515. It is then determined if a key for the recipient can be found at block 520. If not, a non-subscriber policy is checked to determine appropriate action, such as to send it in the clear, request a subscription and/or block the message, at block 525. An action module then carries out the determined policy at block 530, and operation flow 500 is ended and the server is returned to conventional operation at block 595. If a recipient key is found at block 520, it is determined if encryption has been enabled, i.e., an administrative yes/no selector is set to yes, at block 535. If encryption is not enabled, operation flow 500 is ended and the server is returned to conventional operation at block 595. If encryption is enabled, the recipient's public key is acquired at block 540. The server's private key is acquired at block 545. Optionally, where a symmetric key is used, the symmetric key can be generated using the identified public and private keys. The message subject, which was extracted at block 410 (FIG. 4), is then encrypted and replaces the clear text message subject at block 550. The message body is encrypted at block 555. The clear text message body is replaced with the cipher text message body at block 560.

Attachments processing begins at block 565. It is determined if any attachments that have not been encrypted are present at block 570. If there are none, operation flow 500 is ended and the server is returned to conventional operation at block 595. If there are attachments to yet be processed, a yet unprocessed attachment is encrypted at block 575. It is then determined if the encryption was successful, or if an error occurred, at block 580. If the encryption fails, a predetermined action, such as user notification is taken, and operation flow 500 may return to block 575, so the attachment may be processed again. If the encryption is successful, the attachment list pointers are updated to reflect the cipher text attachment at block 585. It is then determined if there are any other attachments to be processed at block 590. If not, operation flow 500 is ended and the server is returned to conventional operation at block 595. If there are attachments to yet be processed, operation flow 500 returns to block 575, such that the yet unprocessed attachment(s) are encrypted. Thereafter, the encrypted e-mail may be transmitted to a mail exchange server associated with the intended recipient.

According to an embodiment of the present invention, blocks 525, 530 may be used to confirm regulation and/or corporate policy compliance and/or satisfy reporting requirements, for example. For example, messages being processed at block 525 may be queued up. The polic(ies) checked and enforced at block 525, 530 may; (1) send an unsecured e-mail, but generate one or more notifications there-regarding; or (2) block an unsecured e-mail.

Referring now to FIG. 6, there is shown an operation flow 600. Operation flow 600 is suitable for being executed on a computing device also executing the recipient's MUA. An operation flow 600 commences with detecting a MUA provided new mail notification detection 605. A private key associated with the recipient is then acquired at block 610. The server's public key is acquired at block 615. Optionally, where a symmetric key is used, the symmetric key can be generated using the identified public a private keys. The message subject is extracted at block 620. The message body is extracted at block 625. It is determined if the message is encrypted at block 630. If it is not, it is then determined if there are other new messages to be processed at block 645. If there are no more new messages, operation flow 600 is ended and the computing device returned to conventional operation at block 675. If there are more messages to be processed, operation flow 600 returns to block 620. If the message is determined to be encrypted at block 630, the message subject and body are decrypted at block 635. The clear text versions of the message subject and body then replace the cipher text versions at block 640.

Attachments processing begins at block 650. It is determined if any attachments are encrypted and available for processing at block 655. If there are none, operation flow 600 is ended and the computing device is returned to conventional operation at block 675. If there are attachments to yet be processed, a yet unprocessed attachment is decrypted at block 660. It is then determined if the decryption was successful, or if an error occurred, at block 665. If the decryption fails, a predetermined action, such as user notification is taken, and operation flow 600 returns to block 655, so the attachment may be processed again. If the decryption is successful, the cipher text version of the attachment is replaced with the decrypted, clear text version at block 670, after which an operation flow 600 returns to block 655 to determine if there are any other attachments to be processed.

While the present invention has hereinto been discussed with regard to fixed public and private keys, multiple keys may be rotated and used and/or keys may be dynamically generated for each e-mail to be sent. For example, each MUA may have multiple sets of public/private keys according to an embodiment of the present invention. One set may be associated with sending e-mails and another may be associated with receiving e-mails. According to an embodiment of the present invention, the receiving associated set(s) of keys may be fixed. According to an embodiment of the present invention, a sending associated set of keys may be dynamically generated for each originated e-mail.

According to an embodiment of the present invention, each MUA may incorporate a random number generator. The random generator may be used to derive a sending public/private key set in a conventional manner. The derived private key may be used in conjunction with an intended recipient's fixed public key to generate a session key. The session key may be used to encrypt the e-mail components. The derived public key may be attached to the e-mail message for use by the recipient's MUA. The attached, derived public key may be used by the recipient's MUA in connection with its fixed receive private key to re-generate the session key, which may then be used as discussed herein-above to decrypt the e-mail message components.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A method for frustrating unauthorized access to an electronic mail message having address, body and attachment information and being transmitted from a first computing device to a second computing device, comprising:
   at the first computing device:
      detecting a request to send the message from a mall user agent application being executed at the first computing device;
      extracting the body information from the message;
      encrypting the extracted body information;
      replacing the extracted body information in the message with the encrypted body information;
      extracting the attachment information from the message;
      encrypting the extracted attachment information;
      replacing the extracted attachment information in the message with the encrypted attachment information; and,
      returning the message having the encrypted body and attachment information to the mail user application for transmission to the second computing device in accordance with the address information; and
      transmitting the message having the encrypted body and attachment information in lieu of the extracted body and attachment information to a third computing device distinct from the second computing device; and,
   at the third computing device:
      decrypting and re-encrypting the transmitted body information;
      decrypting and re-encrypting the transmitted attachment information; and,
      transmitting the re-encrypted body and attachment information in lieu of the extracted body and attachment information to the second computing device.

2. The method of claim 1, further comprising, at the second computing device:
   extracting the re-encrypted body information from a received message;
   decrypting the extracted body information;
   replacing the extracted body information in the message with the decrypted body information;
   extracting the attachment information from the message;
   decrypting the extracted attachment information;
   replacing the extracted attachment information in the message with the decrypted extracted attachment information.

3. The method of claim 1, wherein the encrypting uses a session key.

4. The method of claim 3, wherein the session key is unique to each e-mail.

5. The method of claim 4, wherein the session key corresponds to a fixed recipient key.

6. The method of claim 5, wherein the session key further corresponds to a dynamically generated originator key.

7. The method of claim 1, wherein the detected request is from a mail user agent application being executed at the first computing device.

8. The method of claim 2, further comprising providing the message with the decrypted extracted body and attachment information to a mail user agent being executed at the second computing device.

9. The method of claim 1, wherein the electronic message further has subject information, and the method further comprises extracting and encrypting the subject information at the first computing device.

10. A method for frustrating unauthorized access to an electronic mail message having address, body and attachment information and being transmitted from a first computing device executing a mail user agent application to a second computing device executing a mail user agent application, comprising:
    at a third computing device:
       receiving the electronic mail message;
       decrypting and re-encrypting the body information;
       decrypting and re-encrypting the received attachment information; and,
       transmitting the re-encrypted body and attachment information in lieu of the decrypted body and attachment information to the second computing device; and
    at the second computing device:
       extracting the re-encrypted body information from the transmitted message;
       decrypting the extracted body information;
       lacing the extracted body information in the message with the decrypted extracted body information;
       extracting the attachment information from the message;
       decrypting the extracted attachment information;
       replacing the extracted attachment information in the message with the decrypted extracted attachment information.

11. The method of claim 10, wherein the re-encrypting uses a session key.

12. The method of claim 11, wherein the session key is unique to each e-mail message.

13. The method of claim 12, wherein the session key corresponds to a fixed recipient key.

14. The method of claim 13, wherein the session key further corresponds to a dynamically generated originator key.

15. The method of claim 10, further comprising providing the message with the decrypted extracted body and attachment information to the mail user agent being executed at the second computing device.

16. A system for frustrating unauthorized access to an electronic mail message having address, body and attachment information and being transmitted from a first computing device to a second computing device, comprising:
    a first computer readable medium being accessible by said first computing device and comprising code, which when executed by the first computing device causes the first computing device to:
       detect a request to send the message from a mail user agent application also being executed by the first computing device;
       extract the body information from the message; encrypt the extracted body information;

replace the extracted body information in the message with the encrypted body information;
extract the attachment information from the message;
encrypt the extracted attachment information;
replace the extracted attachment information in the message with the encrypted attachment information; and,
return the message having the encrypted body and attachment information to the mail user application for transmission to the second computing device in accordance with the address information; and
transmit the message having the encrypted body and attachment information in lieu of the extracted body and attachment information to a third computing device distinct from the second computing device; and,
a second computer readable medium being accessible by the third computing device and comprising code, which when executed by the third computing device causes the third computing device to:
decrypt and re-encrypt the transmitted body information;
decrypt and re-encrypt the transmitted attachment information; and,
transmit the re-encrypted body and attachment information in lieu of the extracted body and attachment information to the second computing device.

17. The system of claim 16, further comprising a third computer readable medium being accessible by said second computing device and comprising code, which when executed by the second computing device causes the second computing device to:
extract the re-encrypted body information from a received message;
decrypt the extracted body information;
replace the extracted body information in the message with the decrypted body information;
extract the attachment information from the message:
decrypt the extracted attachment information;
replace the extracted attachment information in the message with the decrypted extracted attachment information; and,
provide the message with the decrypted extracted body and attachment information to a mail user agent being executed by the second computing device.

18. The system of claim 16, wherein the second computer readable medium further comprises code, which when executed by the third computing device causes the third computing device to take an action related to a policy if the extracted information is not re-encrypted.

19. The system of claim 18, wherein the action is selected from the group consisting of transmitting the extracted information without re-encrypting and transmitting a notification to a fourth computing device distinct from the first, second and third computing devices.

20. The system of claim 18, wherein the policy is related to a government privacy requirement.

21. A system for frustrating unauthorized access to an electronic mail message having address, body and attachment information and being transmitted from a first computing device executing a mail user agent application to a second computing device executing a mail user agent application, comprising:
a first computer readable medium being accessible by a third computing device and comprising code, which when executed by the third computing device causes the third computing device to:
receive the electronic mail message:
decrypt and re-encrypt the body information;
decrypt and re-encrypt the received attachment information; and,
transmit the re-encrypted body and attachment information in lieu of the decrypted body and attachment information to the second computing device; and
a second computer readable medium being accessible by the second computing device and comprising code, which when executed by the second computing device causes the second computing device to:
extract the re-encrypted body information from the transmitted message;
decrypt the extracted body information;
replace the extracted body information in the message with the decrypted extracted body information;
extract the attachment information from the message; decrypt the extracted attachment information;
replace the extracted attachment information in the message with the decrypted extracted attachment information; and
provide the message with the decrypted extracted body and attachment information to the mail user agent being executed by the second computing device.

* * * * *